May 4, 1948.  H. H. MAXIM ET AL  2,440,905
SINGLE BLADE PLOW
Filed May 20, 1946   2 Sheets-Sheet 1
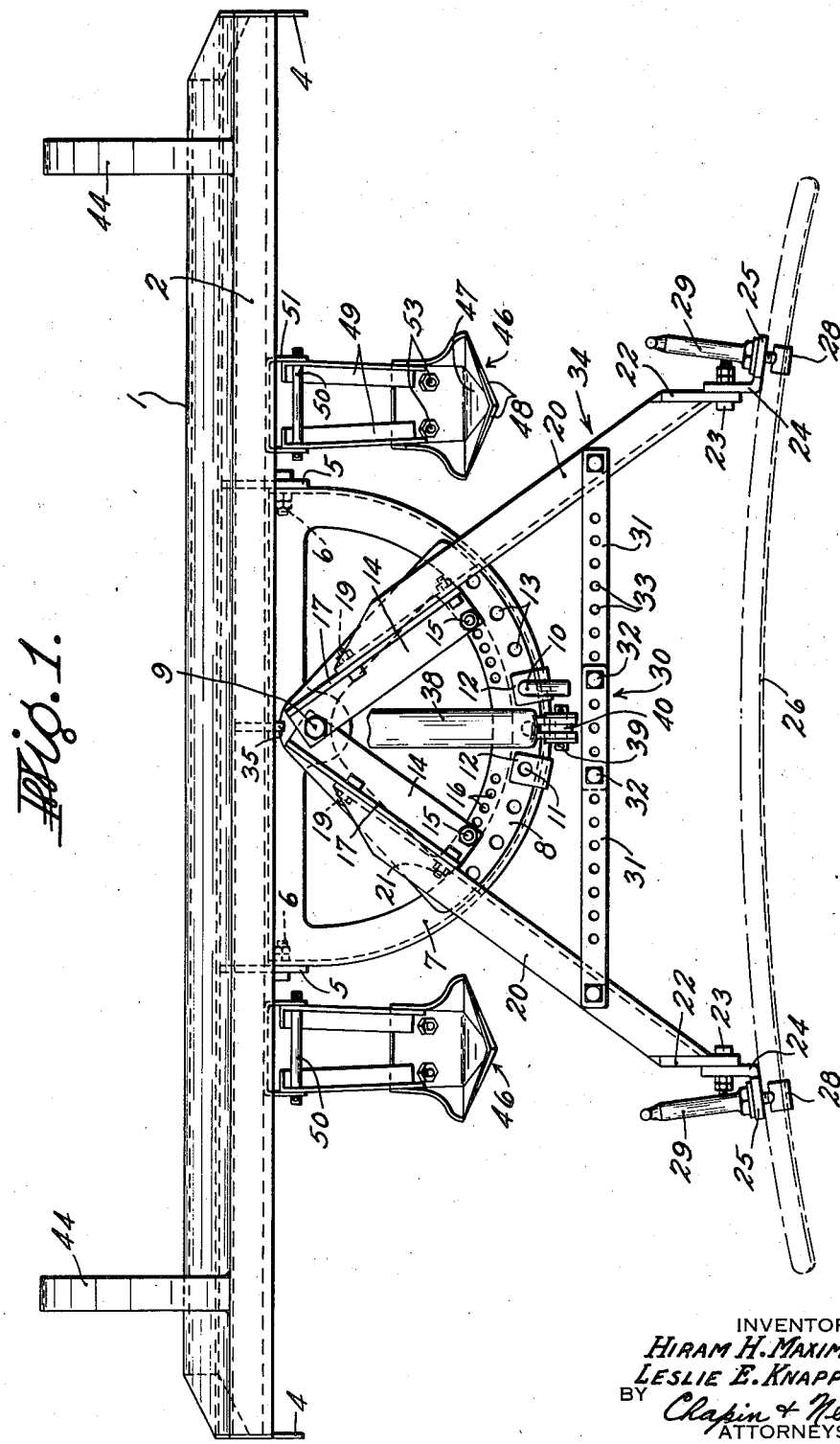
INVENTORS
HIRAM H. MAXIM AND
LESLIE E. KNAPP
BY Chapin & Neal
ATTORNEYS

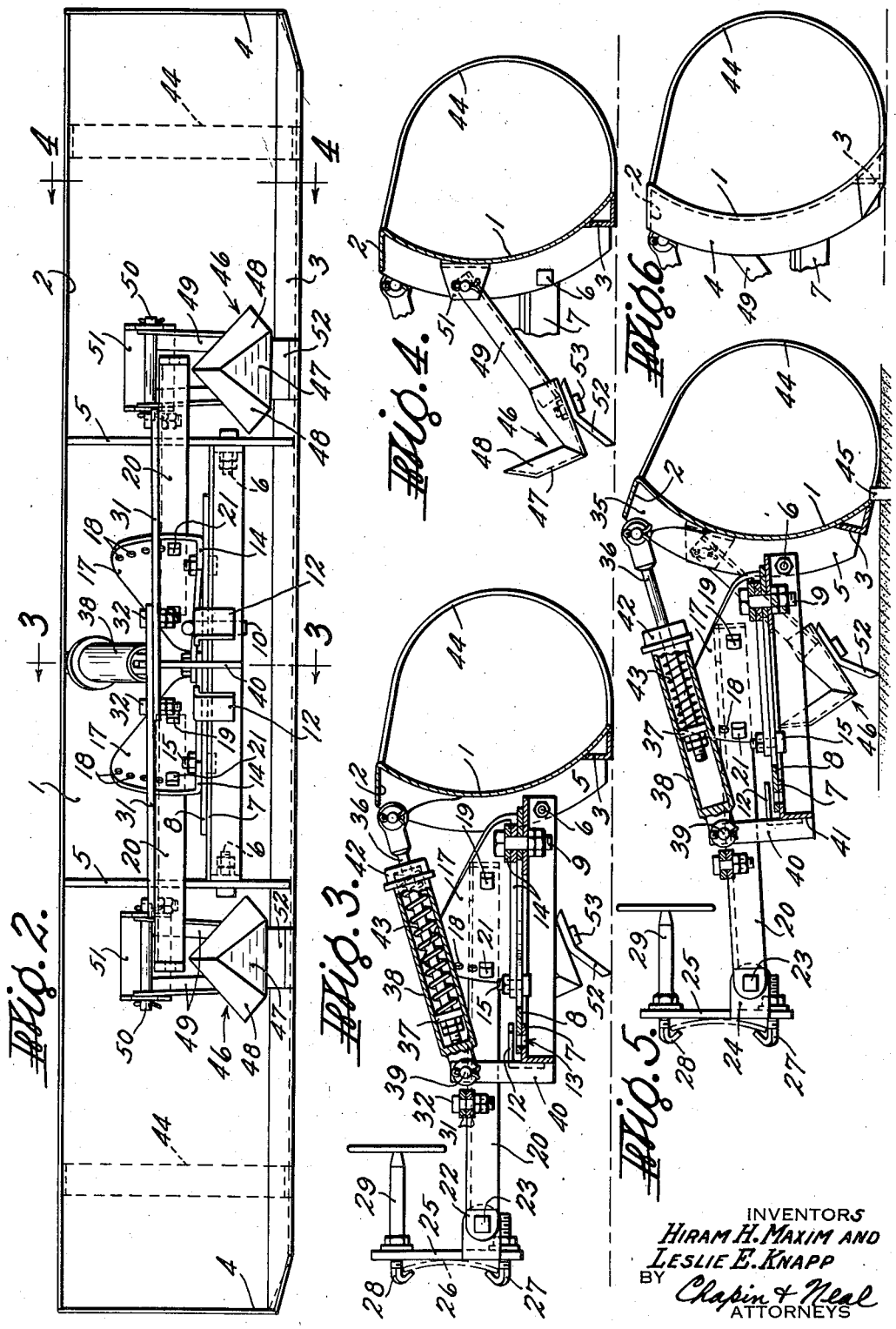

Patented May 4, 1948

2,440,905

UNITED STATES PATENT OFFICE 2,440,905

SINGLE BLADE PLOW

Hiram H. Maxim, Hartford, and Leslie E. Knapp, Wethersfield, Conn., assignors to The Maxim Silencer Company, Hartford, Conn., a corporation of Connecticut Application May 20, 1946, Serial No. 670,878

1 Claim. (Cl. 37—42)

This invention relates to single bladed snowplows, particularly such as are attachable to automobiles, tractors and the like.

One object of the invention is to provide a plow of this general type with improved mechanism for freeing the plow blade automatically from obstructions over which it may pass, without injury to the plow or to the obstruction. A further object is to provide a plow with improved mechanism which will return the plow blade to normal position after clearing the obstruction. A further object is to provide a plow the blade of which will tip forwardly and rise automatically on striking a surface obstruction but which will not be affected by heavy pressure against the snow being plowed. A further object is to provide a single blade plow with simple mechanism by which it may be raised to avoid dragging snow backwardly when the car or tractor is being backed up. A further object is to provide a single bladed plow with mechanism for attaching the plow to the bumper of an automobile, adjustable for different makes of car and readily changed to set the plow at the desired angle and hand. Other objects will appear from the following description and claim.

Referring to the drawings,

Fig. 1 is a top plan view of a plow constructed in accordance with our invention;

Fig. 2 is a rear view thereof;

Fig. 3 is a section on line 3—3 of Fig. 2;

Fig. 4 is a section on line 4—4 of Fig. 2;

Fig. 5 is a section generally similar to Fig. 3 but showing the action of the plow in clearing an obstruction; and Fig. 6 is an end view of the moldboard and associated parts.

The plow comprises a curved moldboard blade 1 the top edge of which is preferably turned back at 2 to form a reinforcement. An angle 3, forming both a runner and a reinforcement, is secured as by welding to the bottom edge of the moldboard. End plates 4 welded to the ends of the moldboard and of the angle 3, and intermediate plates 5 similarly welded, provide the necessary rigidity for the moldboard.

Pivotally bolted at 6 to the intermediate plates 5 is a semicircular sector 7, the pivot axis 6—6 being relatively low on the moldboard for a purpose to be described. A second sector 8 of lesser extent is mounted to swing about the axis of sector 7 upon a pivot bolt 9, and is held in any desired angular position by a pin 10 passing through a hole in sector 7 and an aligned hole 11 in one of two brackets 12 welded to it and also through a selected one of a series of holes 13 in sector 8. The sector 7 being secured to the moldboard as described above, and also connected by a thrust frame to the automobile bumper as described below, the moldboard can be freed for adjustment of its plowing angle by withdrawing the pin 10 and locked in the position selected by replacing it.

Also mounted to swing on pivot bolt 9 are a pair of angle irons each having a horizontal leg 14 bolted at 15 through one of a series of holes 16 in the sector 8 and a vertical leg 17 having a series of holes 18 arranged concentrically about a bolt 19. Mounted on bolts 19 are angle irons 20 secured at any desired vertical angle by bolts 21 passing through selected holes 18. The ends of the angles 20 are provided with plates 22 welded in place and bolted pivotally at 23 to an angle 24 having a vertical extension 25 adapted to lie against the front of the bumper 26 of an automobile. Each vertical plate 25 is provided with a hole for a hook bolt 27 to engage the lower edge of the bumper and with a hook bolt 28 to engage the upper edge of the bumper and having a sleeve nut 29 by which it may be tightened. This type of bumper clamp is described in detail and claimed in the copending application of Maxim and Bourne, Serial No. 670,874, filed May 20, 1946. A brace 30 formed of overlapping bars on angles 31 bolted together at 32 through a series of holes 33 gives lateral rigidity to the parts previously described. In fact, when the adjustments have all been made and the bolts tightened, the structure is substantially a rigid truss 34 pivoted to the bumper at spaced points and to the lower portion of the moldboard so that the latter may rise and fall with the contour of the ground but with the thrust always directed forwardly and downwardly by the truss to keep the moldboard against the ground during plowing.

As thus far described the moldboard is unconnected to the truss except at a pivot axis below its center. In order to have the moldboard held substantially rigid during plowing and yet free to swing forwardly about its pivot to clear itself from obstacles in a manner which will be explained, a yieldable strut is provided. To a bracket 35 welded adjacent the top of the moldboard at its center is pivoted a rod 36 having a head 37 at its rear end which reciprocates like a piston in a cylinder 38 pivoted at 39 to a bracket 40 secured as by welding to the vertical wall 41 of sector 7. The angle irons 20 are adjusted by selecting the bolt holes 18 for the automobile with which the plow is to be used so that the rod 36 strikes the bottom of cylinder 38 when the moldboard is in plowing position, whereby the moldboard cannot tilt rearwardly. The front end of the cylinder is closed by a cap 42, and between this cap and the head 37 is compressed a spring 43. In ordinary plowing this spring does not function, since the pivot axis of the moldboard is sufficiently low so that the pressure of snow rolled up against the moldboard will exert a rearward force upon it which is taken up by contact of rod 36 with the end of the cylinder 38. If the lower edge of the moldboard strikes a rigid obstruction, however, so that the lower edge cannot continue to advance, the boldboard as a unit may tilt forwardly.

In prior constructions in which a spring held, pivoted moldboard was used for this purpose, it was necessary that it tip far enough forward so that the lower edge could slide over the obstruction. Frequently this required that the moldboard tilt so far that it was nearly flat on the ground, resulting in its upper edge digging into the snow so firmly that it would not right itself unless moved backwards. We have provided a simple means by which tilting of the moldboard causes its lower edge to be raised and freed without the necessity of tilting so far that it will slide over the obstruction. This means comprises a pair of generally semicircular hoops 44 welded to the moldboard not far from its ends and projecting forwardly. As the lower edge of the moldboard strikes an obstruction, such as 45 in Fig. 5, the upper part of the moldboard will be pushed ahead, compressing spring 43 and rolling the moldboard as a whole over on the hoops 44. This rolling action gradually lifts the lower edge of the moldboard so that it can clear the obstruction. Spring 43, assisted by snow pressure on the plow, then returns the moldboard to normal position. The hoops are made as narrow as is consistent with strength in order to offer as little resistance as possible to passage through the snow; and are set near the ends of the moldboard to avoid a tendency, which exists when the hoops are too far from the ends, of one end to dig into the ground when the blade tilts.

It is a further feature of this plow that the blade is lifted clear of the ground whenever the plow is moved rearwardly. Each lifter comprises a shoe 46 having a flat bottom 47 and upturned sides 48 welded or otherwise secured to the lower ends of a pair of angle irons 49 pivoted on a pin 50 secured in a U-shaped bracket 51 welded to the rear side of the moldboard. The distance between the pivot pin 50 and the shoe bottom is greater than the distance between the pin and the ground when the blade is in normal position. An angular plate 52, having bolt holes in both legs to permit reversal is bolted at 53 to the front side of the shoe. During normal plowing the plate 52 drags on the ground as in Fig. 4, holding the shoe elevated. If the plow is drawn rearwardly, however, the plate digs in and holds the shoe initially from moving with the plow, so that the blade is elevated until the bottom of the shoe is flat upon the ground and the plate strikes against the rear of the moldboard. In this position the plate 52 is clear of the ground and the plow slides along on the two shoes 46 with the blade raised so that no snow will be scraped up between the blade and the pushing vehicle. Thus the blade is automatically elevated either when an obstruction is encountered or when the plow is moved rearwardly. The result is that much cleaner plowing can be done than with prior types of single blade plows.

We claim:

A snowplow comprising a moldboard, a sector pivoted to the moldboard on a horizontal axis, a second sector pivoted to the first sector on a vertical axis, means to secure said sectors together in selected positions to adjust the plowing angle of the moldboard, a pair of members pivoted on a vertical axis, means for securing said members in selected angular positions to the second sector, struts pivoted to said members and extending rearwardly, means holding the struts to said members in adjusted angular position, a cross brace connecting said struts and adjustable in length to permit angular adjustment of said members and struts, and means for connecting said struts to a pushing vehicle.

HIRAM H. MAXIM.
LESLIE E. KNAPP.

REFERENCES CITED

The following references are of record in the file of this patent:

UNITED STATES PATENTS

| Number | Name | Date |
|---|---|---|
| 1,473,890 | Toy et al. | Nov. 13, 1923 |
| 1,925,397 | Meyer | Sept. 5, 1933 |
| 2,420,591 | Frame et al. | May 13, 1947 |